United States Patent
Kawakami et al.

(10) Patent No.: US 7,583,271 B2
(45) Date of Patent: Sep. 1, 2009

(54) METHOD AND APPARATUS FOR DATA PROCESSING RECOGNIZING AN OBJECT REPRESENTED AS TWO-DIMENSIONAL IMAGE

(75) Inventors: Yuichi Kawakami, Itami (JP); Yuusuke Nakano, Akashi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/798,968

(22) Filed: Mar. 6, 2001

(65) Prior Publication Data
US 2001/0020946 A1 Sep. 13, 2001

(30) Foreign Application Priority Data
Mar. 10, 2000 (JP) ............... 2000-067248

(51) Int. Cl.
G09G 5/02 (2006.01)
(52) U.S. Cl. .................. 345/582; 345/629; 345/584
(58) Field of Classification Search ......... 345/419–427, 345/582, 619, 584, 629; 348/578; 285/276
See application file for complete search history.

(56) References Cited

U.S. PATENT DOCUMENTS

| | | | |
|---|---|---|---|
| 5,345,490 A * | 9/1994 | Finnigan et al. ............. 378/4 |
| 5,706,419 A | 1/1998 | Matsugu et al. |
| 5,990,900 A * | 11/1999 | Seago ..................... 345/427 |
| 6,064,393 A * | 5/2000 | Lengyel et al. ............ 345/427 |
| 6,215,493 B1 * | 4/2001 | Fujita ...................... 345/418 |
| 6,512,518 B2 * | 1/2003 | Dimsdale .................. 345/427 |
| 6,556,196 B1 * | 4/2003 | Blanz et al. .............. 345/419 |
| 6,768,928 B1 * | 7/2004 | Nagasawa et al. .......... 700/98 |
| 2003/0231793 A1 * | 12/2003 | Crampton .................. 382/154 |

FOREIGN PATENT DOCUMENTS

| | | |
|---|---|---|
| JP | 08-014860 A | 1/1996 |
| JP | 08-233556 A | 9/1996 |

OTHER PUBLICATIONS

Hideo Saito; Nobuhiro Tsunashima, Superquadrics parameter estimation from shaiding image using genetic algorithm, 1994, IEEE, pp. 978-983.*

Philippe Lavoie; Dan Ionescu; Emil M. Petriu, 3-D object model recovery from 2-D images using structured light. 1996, IEEE, p. 377-382.*

(Continued)

Primary Examiner—Javid A Amini
(74) Attorney, Agent, or Firm—McDermott Will & Emery LLP

(57) ABSTRACT

In order to generate a three-dimensional shape model corresponding to a two-dimensional image easily, a data processing apparatus includes a three-dimensional shape generating section and a texture image generating section generating a three-dimensional shape and a texture image, respectively, upon application of a model parameter, a two-dimensional image input section receiving an input two-dimensional image, a modulating section for modulating the input two-dimensional image to the three-dimensional shape, and a parameter transforming section calculating a parameter of the modulated two-dimensional image and applying the calculated parameter to the three-dimensional shape generating section and to the texture image generating section.

21 Claims, 8 Drawing Sheets

OTHER PUBLICATIONS

Jyrki Lotjonen; Jukka Nenonen; Toivo Katila, Reconstruction of 3-D geometry using 2-D profiles and a geometric prior model, 1999, IEEE, vol. 18, No. 10, pp. 992-1002.*

Jun Cao, Yimin Mao; Zhenya He, A modeling technique for the recognition and attitude estimation of 3-D objects. IEEE, 1993, pp. 634-637.*

Remin Lin; Wei-Chung Lin, Recovery of 3-D closed surfaces using progressive shell models. IEEE, 1996, pp. 95-99.*

Chang Seok Choi, Analysis and synthesis of facial image sequences in model-based image coding, IEEE, 1994, vol. 4, No. 3, pp. 257-275.*

Laura Caponetti; Anna Maria Faneli, Computer-Aided simulation for bone surgery, IEEE, 1993, pp. 86-92.*

Pedro M. Q. Aguiar; Jose M. F. Moura, Three-dimensional modeling from two-dimensional video, IEEE, 2001, pp. 1541-1551.*

A Morphable Model For The Synthesis Of 3D Faces, Volker Blanz; Thomas Vetter; Max-Planck-Institut f'ur biologische Kybernetik, T ubingen, Germany_SIGGRAPH 99, Los Angeles, CA USA; Copyright ACM 1999.*

Lapped textures Emil Praun, Adam Finkelstein, Hugues Hoppe Jul. 2000 SIGGRAPH '00: Proceedings of the 27th annual conference on Computer graphics and interactive techniques Publisher: ACM Press/Addison-Wesley Publishing Co.*

"Basis Generation and Description of Facial Images Using Principle-Component Analysis", C.S. Choi et al., Journal of Information Processing Graphics and CAD, vol. 46, No. 7, Aug. 1990, pp. 43-50.

"A Morphable Model For The Synthesis Of 3D Faces", V. Blanz et al., SIGGRAPH 99.

"Active Appearance Models", T.F. Cootes et al., In Burkhardt and Neumann, editors, Computer Vision-ECCV'98, vol. II, Frieburg, Germany, 1999.

Japanese Notice of Grounds of Rejection, w/ English translation thereof, issued in Japanese Patent Application No. JP 2000-067248 dated Mar. 24, 2009.

* cited by examiner

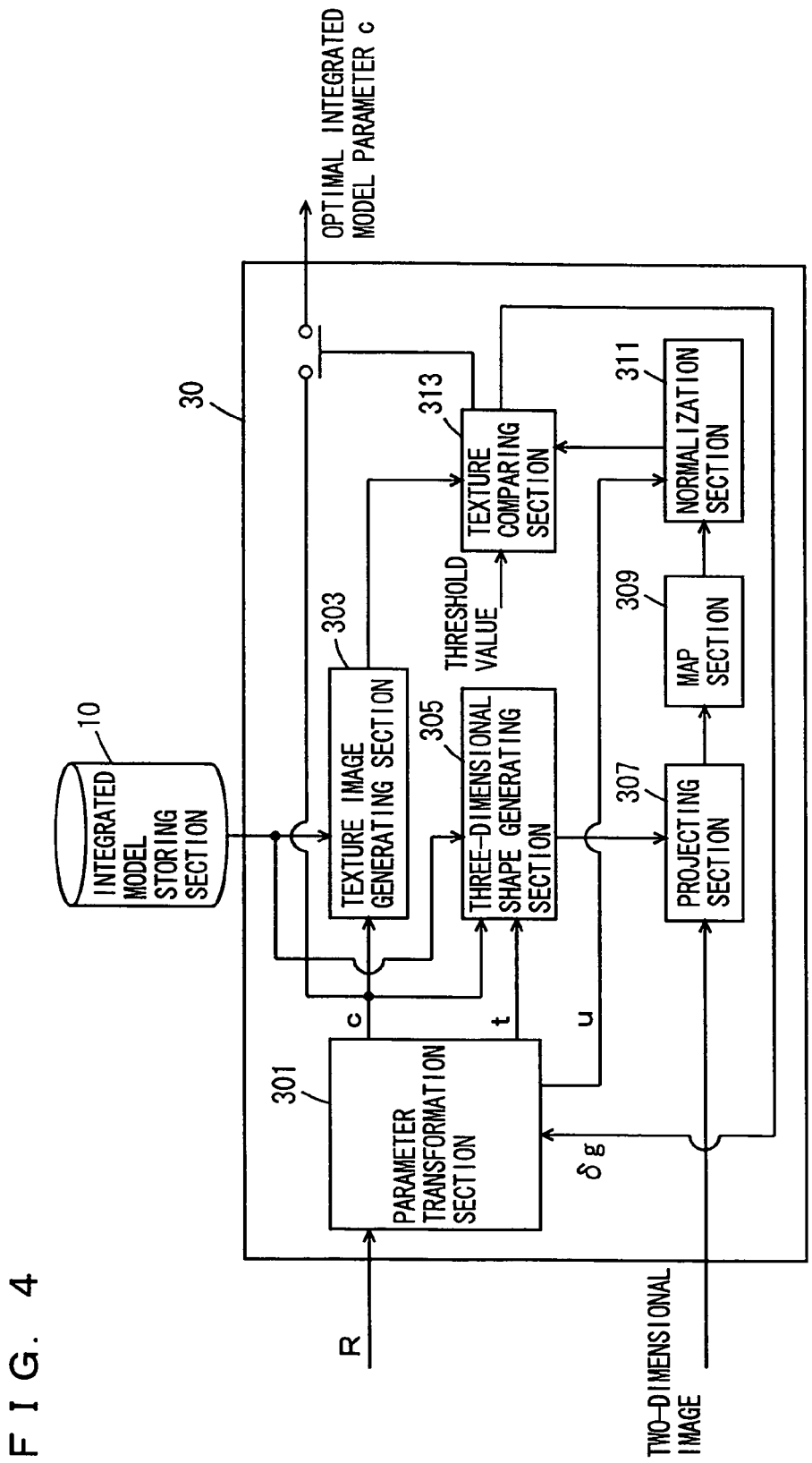
F I G. 4

METHOD AND APPARATUS FOR DATA PROCESSING RECOGNIZING AN OBJECT REPRESENTED AS TWO-DIMENSIONAL IMAGE

This application is based on Application No. 2000-67248 filed in Japan, the content of which is hereby incorporated by reference.

BACKGROUND OF THE INVENTION

1. Field of the Invention

The present invention relates to a method and an apparatus for data processing, recognizing an object represented as a two-dimensional image.

2. Description of the Related Art

Conventionally, studies have been made to recognize an object included in a two-dimensional image, particularly to recognize who it is from a person's face. A face included in an arbitrary obtained two-dimensional image is not always a full face, and the direction of the face may be upward, downward, left or right. As the pose of the face differs image by image, the appearance of the face included in the two-dimensional image also differs. Further, the appearance of the face included in the two-dimensional image differs when the amount of light reflected from the face differs portion by portion, because of different status of light source, for example, used for picking-up the two-dimensional image. In this manner, as the pose of the face changes, or as the state of the light source used for image pick-up changes, the appearance of one's face considerably changes. Therefore, it is impossible to correctly recognize a person included in a two-dimensional image by a simple method of pattern matching.

As means to solve this problem, a model face method has been proposed, in which a face image is represented as a model, and a model parameter is estimated from an input image. Chang Seok CHOI, Toru OKAZAKI, Hiroshi HARASHIMA and Tsuyoshi TAKEBE, "Basis Generation and Description of Facial Images Using Principal-Component Analysis," *Journal of Information Processing Graphics and CAD*, August 1990, vol. 46, No. 7, pp. 43-50 proposes a first example, in which three-dimensional shape of a face and color information position by position of the face (texture) are subjected to principal-component analysis, and a linear sum of the resulting base shape and the texture is used as a method of describing the face image. According to the first method of description, the influence of head-rotation on the face can be eliminated, and thus a realistic face image can be created.

Volker Blanz et al., "A Morphable Model For Synthesis of 3D Faces", *SIGGRAPH* 99 describes a method of recovering a three-dimensional shape from one two-dimensional image, using a linear sum model of a range data and RGB image data in a cylindrical coordinate system, as a second example of the method of describing a face image.

T. F. Coot et. al., "Active Appearance Models", Burkhardt and Neumann, editors, *Computer Vision-ECCV '98*, Vol. II, Frieburg, Germany, 1999 describes a method in which a two-dimensional shape of a face and the texture of the face are subjected to principal-component analysis, respectively, and the resulting base and the model parameter are used for model representation of the face, so as to estimate model parameters from the two-dimensional input image, as a third example of the method of describing the face image. As a relation of a residual between an input image and an estimated model with a modification vector of the model parameter is learned in advance, high speed optimization is realized.

In the first example, however, the method of generating a parameter by the method of description from the input face image is not described. By a simple input of the two-dimensional image, it is impossible to recognize a face image contained therein.

In the second example, the input two-dimensional image and the linear sum model are compared, by finding the residual on the input image plane, and therefore, difference in the shape of the face is not well reflected. Accordingly, even when the linear sum model and the shape of the person in the two-dimensional image are different, sometimes the residual between the two-dimensional image and the image obtained by projecting the linear sum model onto the two-dimensional image becomes small, resulting in higher possibility of erroneous recognition. As the input two-dimensional image provides information of only one plane of a face as a solid body, estimation of the initial value of the parameter is difficult. Further, as the steepest gradient method is used as a method of optimization, it takes time until convergence is attained.

In the third example, the represented model is two-dimensional, and therefore, the three-dimensional shape of the face contained in the input two-dimensional image is not considered. Therefore, it has been difficult to determine whether the difference between the face contained in the two-dimensional image and the model face comes from the difference of pose or not.

SUMMARY OF THE INVENTION

The present invention was made to solve the above described problems and an object of the present invention is to provide a data processing apparatus capable of recognizing an object, taking into consideration the direction of the object represented as a two-dimensional image.

Another object of the present invention is to provide a data processing apparatus capable of recognizing an object, even when the object represented as a two-dimensional image has a shading resulting from a difference in light source.

In order to attain the above described objects, according to an aspect, the present invention provides a data processing apparatus, including: a generating section for generating, in response to an applied model parameter, a three-dimensional shape model and a texture image related to respective portions of the three-dimension shape model; a receiving section receiving an input two-dimension image; a modulating section for modulating the input two-dimensional image into the three-dimension shape model; and a calculating section for calculating a parameter in accordance with the modulated two-dimensional image and applying the calculated parameter to the generating section.

According to the present invention, the generating section generates, in response to an applied model parameter, a three-dimensional shape model and a texture image related to respective positions of the three-dimensional shape model. The input two-dimensional image is modulated into the three-dimensional shape model, the parameter of the modulated two-dimensional image is calculated and the result is applied to the generating section. Thus, a three-dimensional shape model corresponding to the two-dimensional image can be generated easily. As a result, the three-dimensional shape of the object is taken into consideration, and therefore, a data processing apparatus that can correctly recognize the object included in the two-dimensional image can be provided.

Preferably, the present invention provides a data-processing apparatus wherein shading effects of the two-dimensional image are eliminated for the comparison according to a presumed light source, the presumption is based on the input two-dimensional image.

According to the present invention, a data processing apparatus is provided that can recognize an object even when the object represented in the two-dimensional image has a shading resulting from the light source.

According to another aspect, the present invention provides a method of recognizing an object shown by a two-dimensional image, including the steps of: preparing a two-dimensional image showing an object; projecting the prepared two-dimensional image onto a three-dimensional shape model; and recognizing the object shown by the prepared two-dimensional image on the basis of the projected two-dimensional image.

According to a still another aspect, the present invention provides a method of creating data representing an object shown by a two-dimensional image, including the steps of: preparing a two-dimensional image showing an object; projecting the prepared two-dimensional image onto a three-dimensional shape model; and creating data representing an object shown by the prepared two-dimensional image on the basis of the projected two-dimensional image.

According to the present invention, a three-dimensional shape model corresponding to the two-dimensional image can be generated easily. Further, as the three-dimensional shape of the object is considered, a method can be provided which can correctly recognize an object included in the two-dimensional image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram representing a detailed configuration of a parameter search section of the data processing apparatus in accordance with an embodiment of the present invention.

DESCRIPTION OF THE PREFERRED EMBODIMENTS

Figure 1:
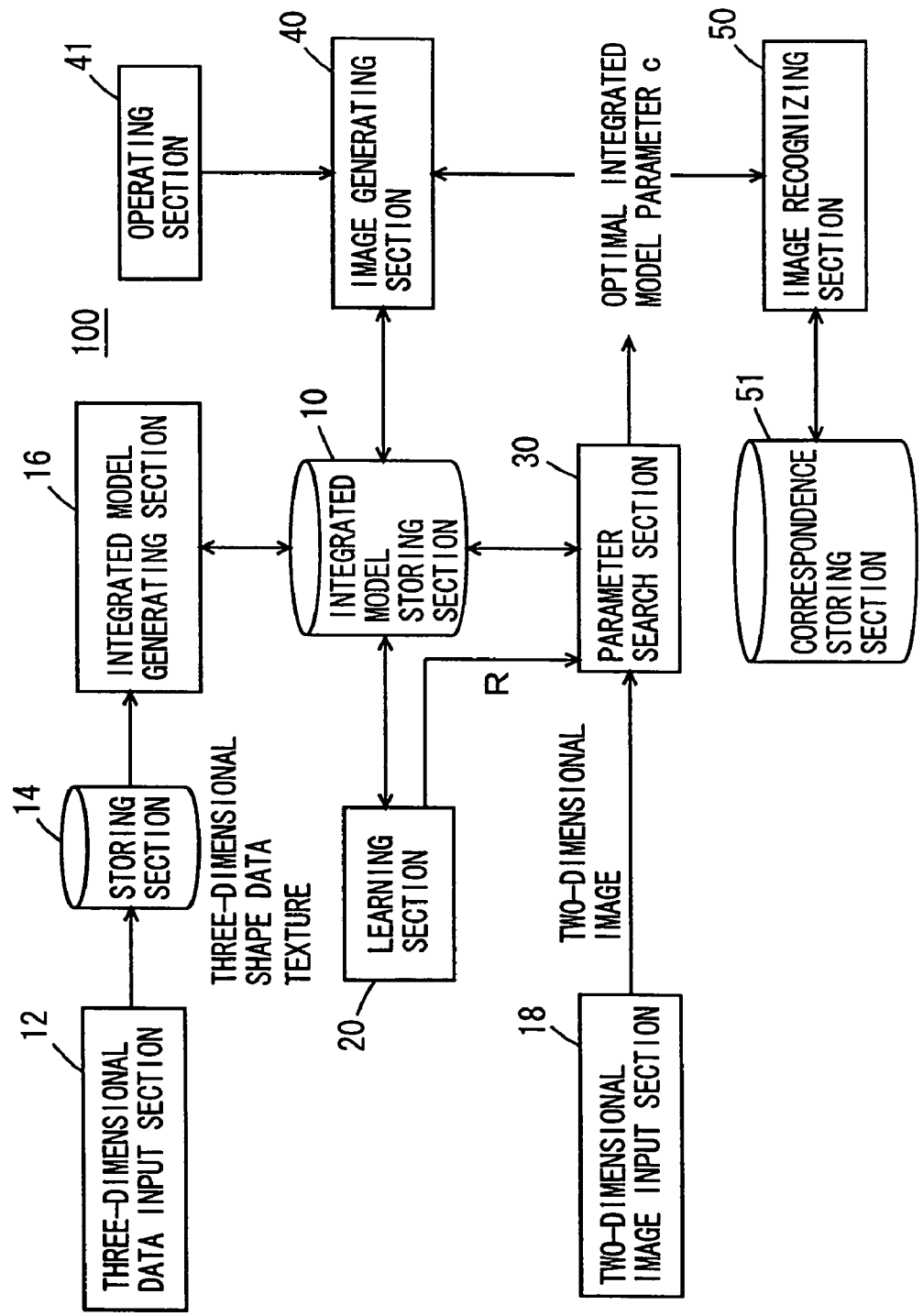
FIG. 1 is a block diagram representing a schematic configuration of a data processing apparatus in accordance with an embodiment of the present invention.

Embodiments of the present invention will be described with reference to the figures. In the figures, the same or corresponding reference characters denote the same or corresponding members.

FIG. 1 is a block diagram representing a schematic configuration of the data processing apparatus in accordance with one embodiment of the present invention. Data processing apparatus 100 in accordance with the present embodiment is for recognizing a face of a person. The object is not limited to the face of a person, and it may be any tangible body.

Referring to FIG. 1, the data processing apparatus in accordance with the present embodiment includes: a three-dimensional data input section 12 receiving as inputs, a three-dimensional shape and a gradation information (texture) of a face of a person; a storing section 14 for storing a three-dimensional shape data and the gradation information output from the three-dimensional data input section 12; an integrated model generating section 16 for generating an integrated model having the three-dimensional shape and the gradation information combined, by a statistical processing of the data stored in the storing section 14; an integrated model storing section 10 for storing the generated integrated model; a two-dimensional image input section 18 for receiving as an input, a two-dimensional image including a face of a person; a parameter search section for searching a parameter of the integrated model corresponding to the face contained in the two-dimensional image; a learning section 20 for finding a modification matrix used for transformation of the parameter at the parameter search section 30; an image generating section 40 for generating an image using the integrated model, based on the optimal integrated model parameter found at the parameter search section 30; a correspondence storing section 51 for storing in advance the two-dimensional image and a characteristic parameter in correspondence with each other; and an image recognizing section 50 for selecting a face image of the same person as the person of the face image included in the two-dimensional image, among the plurality of two-dimensional images stored in advance in the correspondence storing section 51.

The three-dimensional data input section 12 receives as inputs a three-dimensional shape of a face of a person and the texture of the face of the person. The three-dimensional shape and the texture of a face of a person are input through the following steps.

(1) A three-dimensional shape (wire frame model) of a face in which a standard face is approximated by vertexes and lines is formed.

(2) The thus formed three-dimensional shape is matched with a full face of a person as an object of input, so as to form a three-dimensional shape of the face of the person. The three-dimensional shape (wire frame model) is formed by polygons, such as triangles.

(3) For each patch of the polygons of the three-dimensional shape representing the face of the person, a face surface is defined, and gradation information of the full face is projected thereon.

The gradation information projected in this manner is the texture. Therefore, the texture is the gradation information corresponding to patches of respective polygons of the three-dimensional shape.

The three-dimensional data input section 12 receives as inputs the three-dimensional shape and the texture of one person, respectively, which are stored in the storing section 14. Three-dimensional shapes and textures of faces of a plurality of persons are received as inputs at the three-dimensional data input section 14, and stored in the storing section 14.

The integrated model generating section performs principal-component analysis on the three-dimensional shapes stored in the storing section 14, so as to generate a dimensionally compressed statistic three-dimensional shape model. Further, the integrated model generating section performs principal-component analysis on the textures stored in the storing section 14, to generate a dimensionally compressed statistical integrated texture model. The dimensionally compressed statistical three-dimensional shape model and the statistical texture model are integrated and subjected to the principal component analysis, whereby a dimensionally compressed integrated model is generated. The integrated model generated by the integrated model generating section 16 is stored in the integrated model storing section 10. Generation of the integrated model will be described in detail later.

The two-dimensional image input section 18 is capable of picking up images of faces of persons and receiving as inputs two-dimensional images. For example, the two-dimensional image input section may be a digital still camera, a digital video camera or the like that can directly pick-up an image of a person's face. An image scanner reading a photograph of a person's face may be included. A two-dimensional image output from the two-dimensional image input section 18 is transmitted to the parameter search section 30.

The parameter search section 30 forms a three-dimensional shape and the texture closest to the face contained in the two-dimensional image output by the two-dimensional image input section 18 as an integrated model, and outputs an integrated model parameter.

The learning section 20 finds a modification matrix to be used at the parameter search section 30, using the integrated model stored in the integrated model storing section 10. The learning section 20 will be described later.

The image generating section 40 changes the optimal integrated model parameter found by the parameter search section 30, and using the integrated model stored in the integrated model storing section 10, generates a three-dimensional shape model consisting of the three-dimensional shape and the texture. Thus, it becomes possible to generate an image of a face of the person included in the two-dimensional image input to the two-dimensional image input section 18, with the direction of the face made different, or the expression of the face made different. The optimal integrated model parameter is changed based on an operator's instruction input through an operating section 41. The operating section 41 may be a data input apparatus such as a keyboard or a mouse.

The image recognizing section 50 selects, among the two-dimensional images stored in the correspondence storing section 51, such a two-dimensional image of which distance between a vector having the optimal integrated model parameter found at the parameter search section 30 as a component and a vector having the optimal integrated model parameter stored in correspondence with the two-dimensional image stored in the correspondence storing section 51 as a component is smaller than a prescribed value. As the vector distance, mahalanobis distance considering data variance may be used, other than the Euclidean distance. This enables identification of a person included in the two-dimensional image input from the two-dimensional image input section 18.

The correspondence storing section 51 stores the two-dimensional image corresponding to the three-dimensional shape and the texture used for generating the integrated model at the integrated model generating section 16, the optimal integrated model parameter thereof, and the data for identifying the person included in the two-dimensional image (identity information), in correspondence with each other. The data for identifying a person is, for example, individual information including name, for example, which is input through the operating section 41.

Alternatively, the correspondence storing section 51 may store the optimal integrated parameter found at the parameter search section 30 and the data for identifying the person included in the two-dimensional image input from the operating section 41, in correspondence with each other, based on the two-dimensional image input by the two-dimensional image input section 18.

The process performed by the integrated model generating section 16 of the data processing apparatus 100 in accordance with the present embodiment will be described. The integrated model generating section 16 performs a statistical three-dimensional model generating process, a statistical texture model generating process and an integrated model generating process.

[Statistical Three-Dimensional Shape Model Generating Process]

Figure 2:
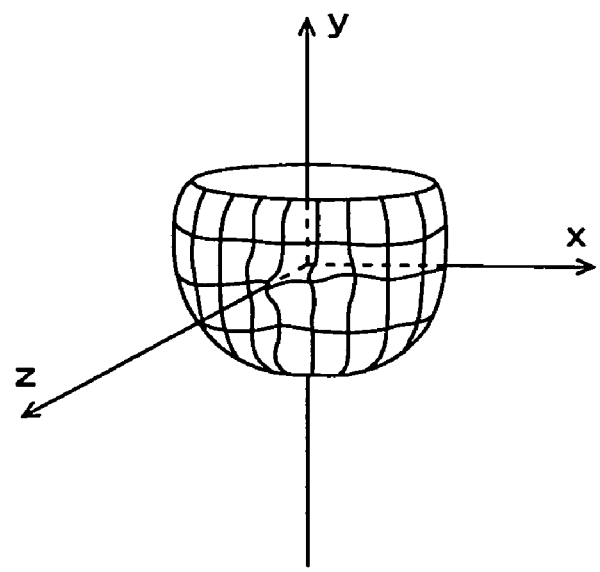
FIG. 2 represents a coordinate system of the three-dimensional shape model.

When a polygon of the three-dimensional shape of a face has n vertexes, the three-dimensional shape can be represented by vectors x of 3n-dimension. The coordinate system of the three-dimensional shape may be defined such that the origin is set at an appropriate position found by linear calculation of the vertex coordinates, for example, the center of gravity, the X axis corresponds to the left/right direction of the face, the Y axis is the up/down direction of the face and the Z axis is the front direction of the face, for example. FIG. 2 shows an example of the coordinate system for the three-dimensional shape. In the coordinate system of the three-dimensional shape shown in FIG. 2, the three-dimensional shape x can be represented by the equation (1).

By principal-component analysis using all the three-dimensional shapes stored in the storing section 14, it is possible to approximate the three-dimensional shape x by the equation (2). Here, x bar represents a mean shape of the three-dimensional shape, which will be referred to as "mean shape" in the following. Ps represents a set of the normal mode (eigen vector) of the change, and bs represents a set of three-dimensional shape parameters. The three-dimensional shape represented by the equation (2) will be referred to as a statistical three-dimensional shape model.

$$x=(X_1,\ldots,X_n,Y_1,\ldots,Y_n,Z_1,\ldots,Z_n)^T \quad (1)$$

$$x=\bar{x}+P_s b_s \quad (2)$$

[Statistical Texture Model Generating Process]

As already described, the texture is defined by the gradation information corresponding to each polygon of the three-dimensional shape. Now, assume that a model consists of a three-dimensional shape x and a texture A. The texture A mapped onto a u-v plane is referred to as a texture image.

The u-v plane may be arbitrarily defined. In the present embodiment, it is defined as cylindrical coordinates represented by a surface of a cylinder surrounding the mean shape obtained by generating the three-dimensional shape.

Figure 3:
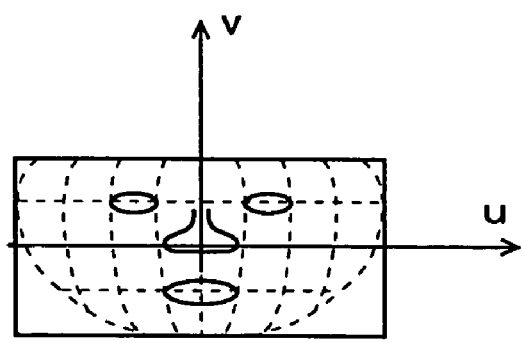
FIG. 3 represents a u-v plane on which a texture image is represented.

FIG. 3 shows an example of the u-v plane. The projection of each polygon of the mean shape onto the u-v plane is realized by transforming the vertex of each polygon of the mean shape in accordance with the equations (3). Thus, each polygon of the mean shape corresponds to a prescribed position of the texture image.

The polygon of the three-dimensional shape X is in one to one correspondence with the polygon of the mean shape. The texture image corresponding to texture A is obtained by establishing the correspondence between the texture A and each polygon of the mean shape, and by projecting the corresponding texture A onto the u-v plane.

Further, by the mapping of the texture image onto the three-dimensional shape X, a three-dimensional shape model is formed, in which the gradation information of each polygon of the three-dimensional shape corresponds to the texture image. Mapping of the texture image to the three-dimensional shape X means formation of a three-dimensional shape model by projecting the texture image onto the mean shape, and providing the gradation information of each polygon of the projected mean shape as the gradation information of each polygon of the three-dimensional shape X.

When the polygon is a triangle, the gradation information of the patch surrounded by three vertexes is warped to the u-v plane by a 3×3 transformation matrix, as represented by the equation (4). Here, x and y represent texture coordinates on one patch. The vector of the third row set to (0, 0, 1) is referred to as affine transformation, and by applying vertex coordinates of the triangular patch, it is possible to find other coefficients of H. Actual warp is calculated by finding $H^{-1}$ and by performing linear interpolation of the gradient information of x-y coordinates, for each u-v coordinate.

The texture image calculated from the texture stored in the storing section 14 is normalized by using the equation (5), with respect to the gain and offset of the gray scale. Here, a represents variance of the texture image, and β represents a mean value of the texture image. The values a and β may be calculated by using the equation (6) from the mean (g bar) of the texture image (hereinafter referred to as "mean image"). Here, "normalized" refers to normalization with the mean value of 0 and variance of 1.

In the equation (6), n represents the number of elements of a vector. Here, the mean image is a mean of the corrected image, and therefore, values α and β will be calculated in a recursive manner. By the principal-component analysis of the set of normalized texture images, the texture image g can be approximated in accordance with the equation (7).

In the equation (7), g bar represents a vector of the mean image of the texture image, $P_g$ represents a set of normal mode (eigen vector) of the change, and $b_g$ represents a set of the texture parameters. The texture image represented by the equation (7) will be referred to as a statistical texture model.

$$u_i = \arctan\left(\frac{\overline{X}_i}{Z_i}\right) \\ v_i = \overline{Y}_i \quad (3)$$

$$\begin{pmatrix} u \\ v \\ 1 \end{pmatrix} = H \begin{pmatrix} x \\ y \\ 1 \end{pmatrix} \quad (4)$$

$$g = (g_{im} - \beta 1)/\alpha \quad (5)$$

$$\alpha = (g_{im} \cdot \overline{g})/n \\ \beta = (g_{im} \cdot 1)/n \quad (6)$$

$$g = \overline{g} + P_g b_g \quad (7)$$

[Integrated Model Generating Process]

There is a possibility that the statistical three-dimensional shape model has a correlation with the statistical texture model. Therefore, the principal-component analysis is applied to form a statistical model of lower dimension. A vector integrating the statistical three-dimensional shape model and the statistical texture model is generated by using the equation (8).

In equation (8), Ws represents a diagonal matrix for providing weights to respective parameters, so as to tolerate difference in unit between the statistical three-dimensional shape model and the statistical texture model. The principal component analysis is applied to these vectors, and the integrated model represented by the equation (9) can be obtained.

In the equation (9), Q represents an eigen vector, and C is a vector of the integrated model parameter controlling both the statistical three-dimensional shape model and the statistical texture model. The statistical three-dimensional shape model and the statistical texture model can be recovered by the equations (10), using the integrated model parameter c. It is noted, however, that Q in the equation (9) has the relation as represented by the equation (11) with $Q_s$ and $Q_g$ of the equation (10).

$$b = \begin{pmatrix} W_s b_s \\ b_g \end{pmatrix} = \begin{pmatrix} W_s P_s^T (x - \overline{x}) \\ P_g^T (g - \overline{g}) \end{pmatrix} \quad (8)$$

$$b = Qc \quad (9)$$

$$\left.\begin{array}{l} x = \overline{x} + P_s W_s^{-1} Q_s c \\ g = \overline{g} + P_g Q_g c \end{array}\right\} \quad (10)$$

$$Q = \begin{pmatrix} Q_s \\ Q_g \end{pmatrix} \quad (11)$$

The parameter search process performed by the parameter search section 300 of the data processing apparatus 100 in accordance with the present embodiment will be described in the following.

[Parameter Search Process]

FIG. 4 is a block diagram representing a detailed configuration of the parameter search section 30. Referring to FIG. 4, the parameter search section 30 includes: a parameter transformation section 301 for generating or transforming an integrated model parameter c, a pose parameter t and a light source parameter u; a texture image generating section 303 for generating a texture image from the integrated model based on the integrated model parameter c output from the parameter transformation section 301; a three-dimensional shape generating section 305 for generating a three-dimensional shape from the integrated model based on the integrated model parameter c; a projecting section 307 for projecting the two-dimensional image output from the two-dimensional image input section 18 onto the three-dimensional shape generated by the three-dimensional shape generating section 305; a map section 309 for generating a texture image by mapping the gradation information of the two-dimensional image projected by the projecting section 307 to the u-v plane; a normalization section 311 for removing the influence of shading from the generated texture image; and a texture comparing section 313 for comparing the texture image generated by the texture image generating section 303 with the texture image from which shading is removed by the normalization section 311.

Figure 5:
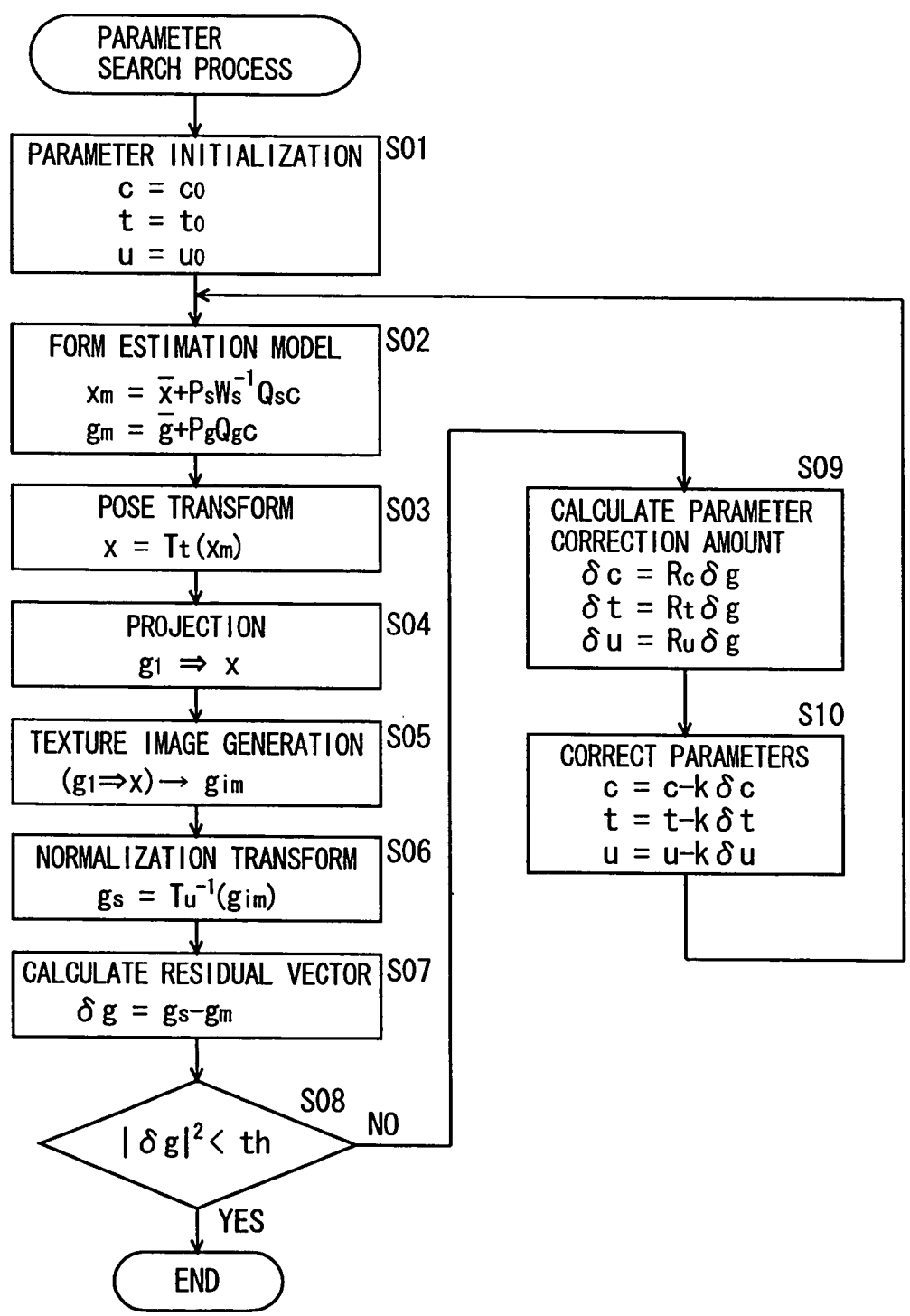
FIG. 5 is a flow chart representing the flow of a parameter search process performed by the parameter search section of the data processing apparatus in accordance with the embodiment.
Figure 6:
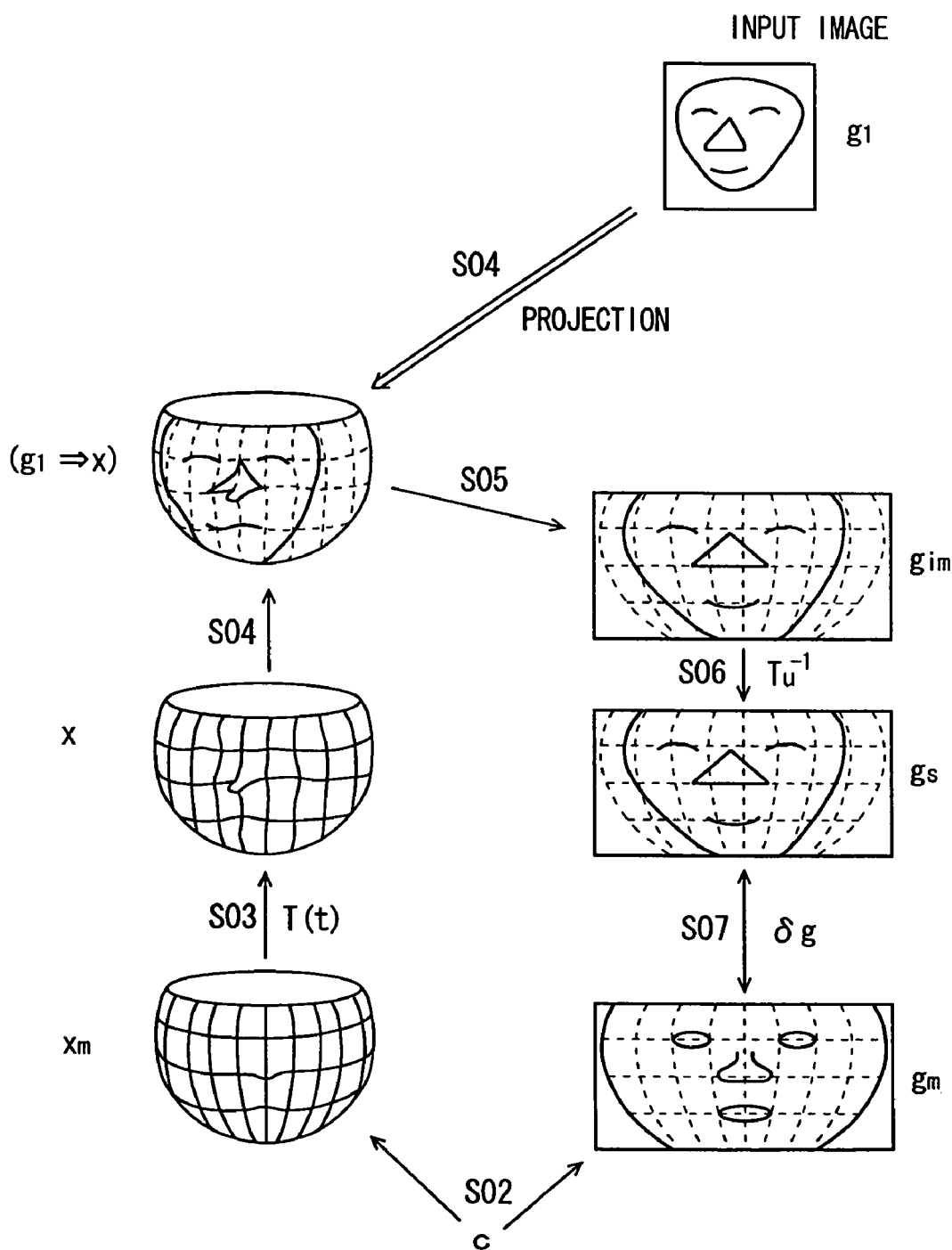
FIG. 6 is a schematic diagram illustrating the parameter search process.

FIG. 5 is a flow chart representing the flow of the parameter search process performed by the parameter search section 30. FIG. 6 is a schematic diagram representing the flow of the parameter search process. In FIG. 6, the texture image is schematically shown on the right side, and the three-dimensional shape models are schematically shown on the left side. The reference characters of FIG. 6 correspond to the reference characters of FIG. 5.

Referring to FIG. 5, in the parameter search process, first, initial values are input to respective parameters at the parameter transformation section 301 (step S01). The parameter includes an integrated model parameter c, a pose parameter t and a light source parameter u.

The pose parameter t is for performing rotational transform and translational transform (which are collectively referred to as pose transform) of the three-dimensional shape model. The light source parameter u is for performing normalization transform to remove influence of shading from the texture image, or to perform inverse normalization transform to add the influence of shading to the texture image. The pose transform and the normalization inverse-normalization transform will be described later.

It is preferable that a prescribed value is set in advance as the initial value of each parameter. When the initial value is not determined, "0" may be used. Here, the initial value of the three-dimensional shape statistical parameter c is represented by $c_0$, the initial value of the pose parameter t is represented by $t_0$ and the initial value of the light source parameter u is represented by $u_0$.

When the initial values are set, an estimation model is formed in step S02. Formation of the estimation model is performed by a three-dimensional shape generating section 305 and a texture image generating section 303. The three-dimensional shape generating section 305 forms the three-dimensional shape $x_m$ using the equation (12) based on the parameter c. Texture image generating section 303 generates a texture image $g_m$ using the equation (13) based on the integrated model parameter c. By the generated three-dimensional shape $x_m$ and the texture image $g_m$, the estimation model is configured.

Thereafter, the calculated three-dimensional shape is subjected to pose transform (step S03). Pose transform is performed by using the equation (14) by the three-dimensional shape generating section 305. The equation (14) represents pose transform from the three-dimensional shape $x_m$ to the three-dimensional shape x, using the pose parameter t.

The pose transform includes rotational transform and translational transform. The pose parameter t is given by the equation (15). Here, s represents scale, $\Phi$, $\theta$ and $\Psi$ represent rotation, and $t_x$, $t_y$ and $t_z$ represent positional change of the three-dimensional shape model.

When rotational transform is represented by 3 degrees of freedom in roll angle $\Phi$, pitch angle $\theta$ and yaw angle $\Psi$, the rotational transform D can be given by the equation (16). Accordingly, pose transform $T_t$ can be represented by the equation (17) in the three-dimensional coordinates. When projection of the three-dimensional shape model from the two-dimensional image is performed by orthogonal projection assuming a camera at the position of $z=\infty$, tx may be $t_x=0$. As to pose transform, multiple resolution approach may be taken to cope with a large deviation.

To the pose-transformed three-dimensional shape x, a two-dimensional image $g_1$ output from two-dimensional image input section 18 is orthogonally projected. The orthogonal projection is performed by the projecting section 307. In this manner, gradation information is added to respective polygons of the pose transformed three-dimensional shape x. The model of the three-dimensional shape with the gradation information added will be referred to as the three-dimensional shape model.

In step S05, a texture image $g_{im}$ is generated from the three-dimensional shape model obtained in step S04. Generation of the texture image $g_{im}$ is performed by the map section 309. The map section 309 maps the gradation information of the three-dimensional shape model onto the u-v plane, to form the texture image $g_{im}$.

In the next step S06, the texture image $g_{im}$ generated at the map section 309 is normalized. Normalization of the texture image is performed by using the equation (18) at the normalization section 311. The equation (18) represents normalization transform of the texture image $g_{im}$ to a texture image $g_s$ using the light source parameter u.

In the next step S07, difference between the texture image $g_m$ generated by the texture image generating section 303 and the texture image $g_s$ normalized by the normalization section 311 is calculated as an error vector $\delta g$.

Sometimes, only a part of the texture image can be obtained from the gradation information orthogonally projected in step S04. Sometimes, the actually input two-dimensional image may be an image picked-up with the person wearing glasses. In such a case, the gradation information of the face image behind the glasses may not be obtained. To cope with such a situation, a factor of the error vector $\Delta g$ having a prescribed value or higher is set to "0" in step S07. This enables calculation of an optimal three-dimensional shape linear parameter correctly, regardless of a generation of an occlusion.

Thereafter, whether the norm square of the calculated error vector is smaller than a threshold value th or not is determined (step S08). If the norm square is not smaller than the threshold value th, the flow proceeds to the step S09. If it is smaller than the threshold value, the integrated model parameter c used in step S02 is regarded as the optimal parameter, and the process terminates.

The processes in steps S07 and S08 are performed in the texture comparing section 313. When the norm square of the error vector $\delta g$ is not smaller than the threshold value th, the texture comparing section 313 transmits the error vector $\delta g$ to the parameter transforming section 301.

In step S09, an amount of correction of the parameter is calculated. The parameter correction amount is calculated in accordance with the equations (19), using the error vector $\delta g$. In equations (19), Rc, Rt and Ru are modification matrixes corresponding to the integrated model parameter c, pose parameter t and the light source parameter u, respectively. The modification matrixes Rc, Rt and Ru will be described later.

Based on the parameter correction amounts $\delta c$, $\delta t$ and $\delta u$ calculated in step S09, respective parameters are corrected (step S10). Correction of the parameter is performed in accordance with the equations (20). In equations (20), the value k is 1, as a standard. It is unnecessary, however, to fix the value, and an optimal value may be selected in repeated cycles.

The processes of steps S09 and S10 are performed by the parameter transforming section 301. Parameter transforming section 301 provides the corrected parameters c, t and u as new parameters.

Thereafter, the flow proceeds to step S02, and the above described process steps are repeated, using the corrected new parameters.

In the present embodiment, determination as to whether repetition should be terminated is performed in step S08 by comparing the norm square of the error vector $\delta g$ with a threshold value. The repetition may be terminated and the process may be terminated when error improvement is no further attained and convergence is confirmed.

$$x_m = \bar{x} + P_s W_s^{-1} Q_s c \tag{12}$$

$$g_m = \bar{g} + P_g Q_g c \tag{13}$$

$$x = T_t(x_m) \tag{14}$$

$$t = (s, \Phi, \theta, \Psi, t_x, t_y, t_z) \tag{15}$$

$$D = D(Z, \phi) D(Y, \theta) D(X, \psi) \tag{16}$$

$$= \begin{bmatrix} \cos\phi & -\sin\phi & 0 \\ \sin\phi & \cos\phi & 0 \\ 0 & 0 & 1 \end{bmatrix} \begin{bmatrix} \cos\theta & 0 & \sin\theta \\ 0 & 1 & 0 \\ -\sin\theta & 0 & \cos\theta \end{bmatrix} \begin{bmatrix} 1 & 0 & 0 \\ 0 & \cos\psi & -\sin\psi \\ 0 & \sin\psi & \cos\psi \end{bmatrix}$$

$$T_t = \begin{bmatrix} \cos\phi\cos\theta & m_1 & m_2 & t_x \\ \sin\phi\cos\theta & m_3 & m_4 & t_y \\ -\sin\theta & \cos\theta\sin\psi & \cos\theta\cos\psi & t_z \\ 0 & 0 & 0 & 1+s \end{bmatrix} \tag{17}$$

$$m_1 = \cos\phi\sin\theta\sin\psi - \sin\phi\cos\psi$$
$$m_2 = \cos\phi\sin\theta\cos\psi + \sin\phi\cos\psi$$
$$m_3 = \sin\phi\sin\theta\sin\psi + \cos\phi\cos\psi$$
$$m_4 = \sin\phi\sin\theta\cos\psi - \cos\phi\sin\psi$$

$$g_s = T_u^{-1}(g_{im}) \tag{18}$$

$$\left. \begin{array}{l} \delta c = R_c \delta g \\ \delta t = R_t \delta g \\ \delta u = R_u \delta g \end{array} \right\} \tag{19}$$

$$\left. \begin{array}{l} c = c - k\delta c \\ t = t - k\delta t \\ u = u - k\delta u \end{array} \right\} \tag{20}$$

[Normalization Transform]

In the parameter search process from the two-dimensional image using the three-dimensional shape model, the two-dimensional image is influenced by the shading resulting from positional difference of the light source, and therefore, parameter search must be performed taking into consideration the influence of the shading.

As the gradation information input to form the integrated model, a shadowless sample is input. Therefore, when the input two-dimensional image is influenced by the shading, it is necessary to transform the image to a shadowless texture image with the influence of shading removed. From the three-dimensional shape and the texture image, it is possible to estimate the position and intensity of the light source.

Assuming that a surface of an object is a perfect diffusion surface (Lambertial Surface), an image intensity I (p) of the object surface at a position p is given by the equation (21). Here, $n_p$ represents a reflectivity vector of the object surface p. The direction of the reflectivity vector $n_p$ is the direction of the normal of the position p, and the length represents the reflectivity of the object. Here, s represents the light source vector. The direction of the light source vector s represents the direction of emission of the light source, and the length represents the intensity of the light source.

As the light source vector s is a three-dimensional vector, it can be represented as a sum of three base vectors. By transforming the equation (21), the equation (22) is derived, and a two-dimensional image obtained at an arbitrary light source position can be represented by a linear sum of an image obtained under the light sources at three positions.

As the perfect diffusion surface is independent from the direction of the line of sight of the viewer, it can be applied to the texture image of the three-dimensional shape model projected on a cylindrical surface. As to the actually input two-dimensional image, it may be closer to the actual situation to set a model illuminated by a main light source and the ambient light. Therefore, here, it is assumed that the image intensity I (p) of the object surface at the position p is given by the equation (23). In the equation (23), $I_0$ (p) represents an image in the presence of diffusion light only.

When the light source vector s is split into three components, it can be represented by the equation (24). The equation (24) represents that an input arbitrary two-dimensional image can be reproduced by a linear sum of a total of four images, that is, the shadowless texture image of the integrated model, and three shading images obtained by providing shadings on the shadowless texture image with light sources in three directions. When the position of the light source is set by the coordinate system of the integrated model, the three shading images can be uniquely calculated by the model parameter.

The light source parameter u is given by the equation (25). In the equation (25), the light source parameter u is represented by a gain parameter $u_1$, an offset parameter $u_2$ and shading correction parameters $v_1$, $v_2$, and $v_3$.

Assume that the texture image of the integrated model is normalized in accordance with the equation (26). When the light source parameter u is newly defined by the equation (27), the inverse normalization transform can be represented by the equation (28). Here, $g_{d1}$, $g_{d2}$ and $g_{d3}$ represent images obtained by providing shadings with light sources in three directions to the applied texture image g and the three-dimensional shape model x.

The light source parameter u' satisfying the equation (29) is given by the equation (30).

In this manner, in the normalization transform or inverse normalization transform of the texture image, influence of the shading is considered using the three shading images $g_{d1}$, $g_{d2}$ and $g_{d3}$ calculated from the texture image g and the three-dimensional shape model x. More specifically, when the texture image g is subjected to normalization transform, the influence of the shading is removed and when the texture image is subjected to inverse normalization transform, the influence of the shading is added.

Here, the three shading images $g_{d1}$, $g_{d2}$ and $g_{d3}$ are images with shadings provided by light sources at three directions. Therefore, by using a linear sum of the three shading images onto the texture image g, it is possible to take into consideration all the influences of the shadings.

$$I(p) = n_p \cdot s \tag{21}$$

$$I(p) = n_p \cdot [\alpha_1 s_1 + \alpha_2 s_2 + \alpha_3 s_3] \tag{22}$$
$$= \alpha_1 I_1(p) + \alpha_2 I_2(p) + \alpha_3 I_3(p)$$

$$I(p) = \alpha_0 I_0(p) + n_p \cdot s \tag{23}$$

$$I(p) = \alpha_0 I_0 + n_p \cdot [\alpha_1 s_1 + \alpha_2 s_2 + \alpha_3 s_3] \tag{24}$$
$$= \alpha_0 I_0(p) + \alpha_1 I_1(p) + \alpha_2 I_2(p) + \alpha_3 I_3(p)$$

$$u = (u_1, u_2, v_1, v_2, v_3) \tag{25}$$

$$g = \frac{g_{im} - \beta \cdot 1}{\alpha_0} \tag{26}$$

$$u = (u_1, u_2, v_1, v_2, v_3) = (\alpha_0 - 1, \beta, \alpha_1, \alpha_2, \alpha_3) \tag{27}$$

$$g_{im} = T_u(g) = (1 + u_1)g + u_2 \cdot 1 + v_1 g_{d1} + v_2 g_{d2} + v_3 g_{d3} \tag{28}$$

-continued $$T_{u'}(g) = T_{u+\delta u}(g) = T_u(T_{\delta u}(g)) \qquad (29)$$

$$\left.\begin{array}{l} 1 + u'_1 = (1 + u_1)(1 + \delta u_1) \\ u'_2 = (1 + u_1)\delta u_2 + u_2 \\ v'_1 = v_1 + \delta v_1 \\ v'_1 = v_2 + \delta v_2 \\ v'_3 = v_3 + \delta v_3 \end{array}\right\} \qquad (30)$$

In this manner, in the data processing apparatus 100 in accordance with the present embodiment, when the input two-dimensional image is compared with the three-dimensional shape model formed of the three-dimensional shape and the texture, the texture image is projected onto the three-dimensional shape for comparison. Therefore, it is possible to recognize the object while considering the shape of the object in the input two-dimensional image. Therefore, the object in the two-dimensional image can be recognized with higher accuracy.

When the input two-dimensional image is compared with the three-dimensional shape model represented by the three-dimensional shape and the texture, generally, comparison is performed on the input two-dimensional image plane. In this case, the shape of the three-dimensional shape model cannot effectively be utilized. Further, the input two-dimensional image provides only the information of one plane of the face which is a three-dimensional body. Therefore, in the parameter search of the integrated model, it is difficult to estimate the initial values of the parameters. When comparison is performed by a texture image in the cylindrical coordinate system that can have all-around data of the integrated model, the object in the input two-dimensional image can be recognized with higher efficiency.

[Modification Matrix Generating Process]

The parameters to be determined in the parameter search process described above includes, in addition to the integrated model parameter c, the pose parameter t and the light source parameter u.

The modification matrix generating process is a process to find modification matrixes Rc, Rt and Ru that satisfy the equation (31), by linear regression of the relation between perturbation vectors δc, δt and δu of the integrated parameter c for determining a sample model consisting of a model shape and a model texture, the pose parameter t for determining posture variation and the light source parameter u for determining light source variation, respectively, with the error vector δg of the texture image at that time. The modification matrix generating process is performed by the learning section 20.

Figure 7:
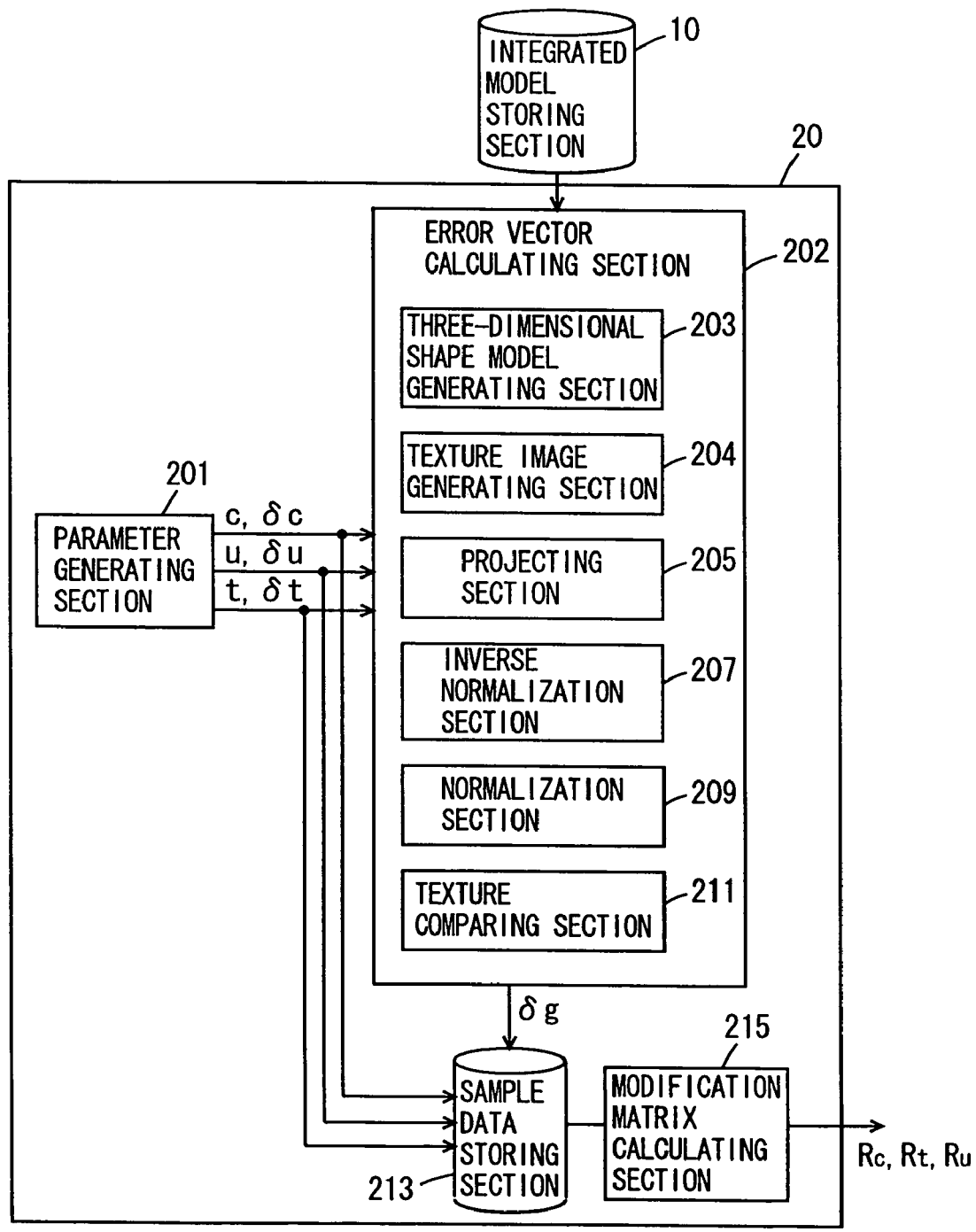
FIG. 7 is a block representing a detailed configuration of a learning section of the data processing apparatus in accordance with an embodiment.

FIG. 7 is a block diagram representing a detailed configuration of the learning section 20 of the data processing apparatus 100 in accordance with the present embodiment. Referring to FIG. 7, learning section 20 includes parameter generating section 201 for generating parameters c, u and t and perturbation vectors δc, δu and δt, respectively, an error vector calculating section 202 for calculating the error vector δg, a sample data storing section 213 for storing the parameters generated by the parameter generating section 201 and the error vector δg calculated by the error vector calculating section 202 in correspondence with each other, and a modification matrix calculating section 215 for calculating the modification matrixes Rc, Rt and Ru, using the parameters and the error vectors stored in the sample data storing section 213.

The perturbation vector calculating section 202 includes: a three-dimensional shape model generating section 203 for generating a model shape or a presumed model shape from the integrated model stored in the integrated model storing section 10, based on the integrated parameter c and the perturbation vector δc generated by the parameter generating section 201; a texture image generating section 204 for generating a model texture image or a presumed model texture image from the integrated model stored in the integrated model storing section 10; a projecting section 205 for projecting the texture image mapped on the three-dimensional shape to the u-v plane represented by a cylinder; an inverse normalization section 207 for performing inverse normalization transform to add the influence of shading on the texture image; a normalization section 209 for performing normalization transform to remove the influence of shading from the texture image; and a texture comparing section 211 for comparing the two texture images.

Figure 8:
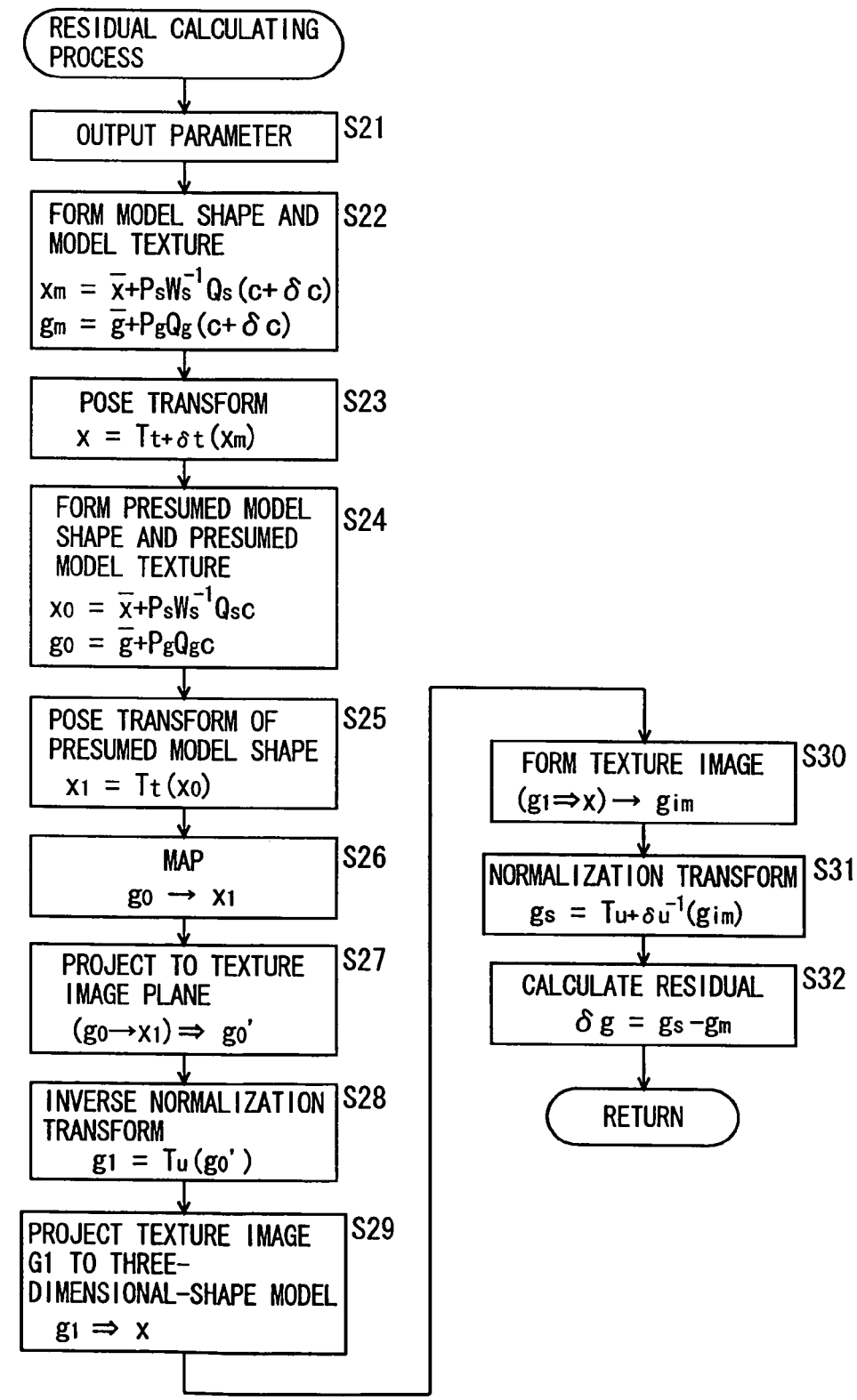
FIG. 8 is a flow chart representing the flow of a residual calculating process performed by the learning section of the data processing apparatus in accordance with an embodiment.
Figure 9:
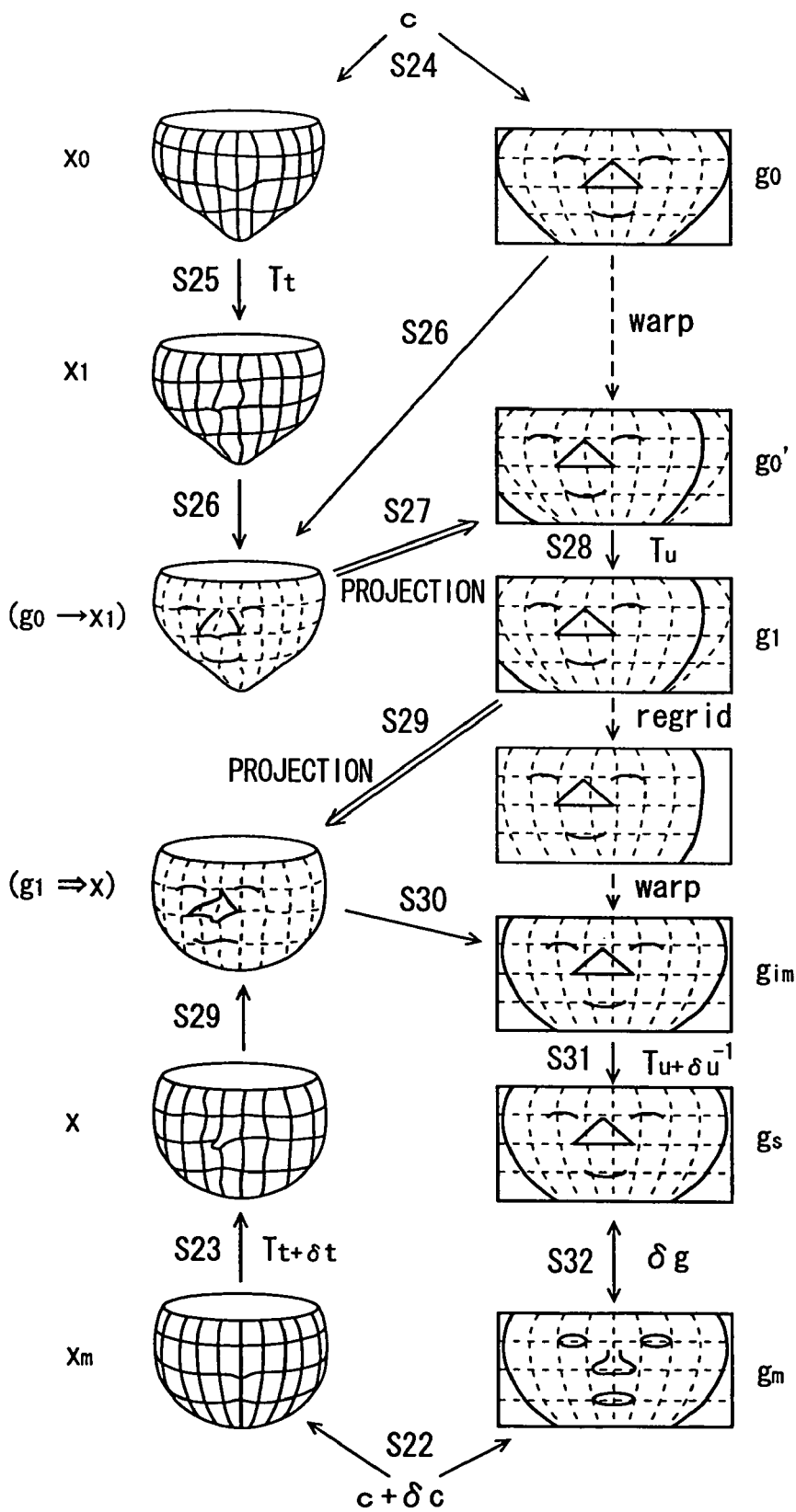
FIG. 9 is a schematic diagram illustrating the flow of the residual calculating process.

FIG. 8 is a flow chart representing the residual calculating process performed at the learning section 20. FIG. 9 schematically shows the flow of the residual calculating process. In FIG. 9, the right side represents texture images, and the left side represents three-dimensional shape models including the three-dimensional shape and the texture image mapped or projected thereon.

Referring to FIGS. 8 and 9, the residual calculating process starts from the input of parameters (step S21). The parameters input here include the integrated model parameter c and the perturbation vector δc thereof, the pose parameter t and the perturbation vector δt thereof, and the light source parameter u and the perturbation vector δu thereof. The parameters may be arbitrarily input by an operator through an input section such as a keyboard provided on the data processing apparatus 100, or the parameters may be automatically generated by the parameter generating section 201 of the learning section 20.

By using the integrated parameter c, the model shape and the model texture image are formed (step S22). The three-dimensional shape model generating section 203 generates the three-dimensional shape, based on the integrated model stored in the integrated model storing section 10, using the integrated model parameter c and the perturbation vector δc thereof, generated by the parameter generating section 201. The three-dimensional shape generated based on the integrated model parameter (c+δc) is the model shape $x_m$.

The texture image generating section 204 generates the texture image based on the integrated model stored in the integrated model storing section 10, using the integrated model parameter c and the perturbation vector δc generated by the parameter generating section 201. The texture image generated based on the integrated model parameter (c+δc) is the model texture image $g_m$. Model shape $x_m$ is represented by the equation (32), and the model texture image $g_m$ is represented by the equation (33).

Thereafter, the pose transform of the model shape $x_m$ is performed (step S23). The three-dimensional shape model generating section 203 performs pose transform in accordance with the equation (34) on the model shape $x_m$ generated previously, using the pose parameter t and the perturbation vector δt thereof, generated by the parameter generating section 201. The equation (34) represents pose transform of the three-dimensional shape $x_m$ to the three dimensional shape x, using the pose parameter (t+δt).

Thereafter, the presumed model shape and the presumed model texture are formed (step S24). The three-dimensional shape model generating section 204 generates the three-dimensional shape based on the integrated model stored in the integrated model storing section 10, using the integrated model parameter c generated by the parameter generating section 201. The three-dimensional shape generated using the integrated model parameter c is the presumed model shape $x_0$.

The texture image generating section 204 generates the texture image based on the integrated model stored in the integrated model storing section 10, using the integrated parameter c generated by the parameter generating section 201. The texture image generated by using the integrated model parameter c is the presumed model texture image $x_0$.

The presumed model shape $x_0$ and the presumed model texture $g_0$ correspond to the original model. The presumed model shape $x_0$ is represented by the equation (35), and the presumed model texture image $g_0$ is represented by the equation (36).

Thereafter, pose transform using the pose parameter t is performed on the presumed model shape $x_0$ (step S25). The three-dimensional shape model generating section 203 performs pose transform on the presumed model shape $x_0$ calculated in advance, based on the equation (37), using the pose parameter t generated by the parameter generating section 201. When we represent the presumed model shape after pose transform by $x_1$, pose transform using the pose parameter t can be represented by the equation (37).

Thereafter, the presumed model texture image $g_0$ calculated in step S24 is mapped to the pose transformed presumed model shape $x_1$ calculated in step S25 (step S26). In this manner, gradation information is added to respective polygons of the presumed model shape $x_1$. The added gradation information is the texture.

The texture map in step S26 is projected onto the cylindrical coordinate system (step S27). Projecting section 205 projects the presumed model texture $g_0$ mapped to the presumed model shape $x_1$ that has been generated and posed transform by the three-dimensional shape model generating section 203, to the cylindrical coordinate system. Thus, the gradation information is projected on the cylindrical coordinate system, and the texture image $g_0'$ is formed on the u-v plane.

The processes of steps S26 and S27 may be replaced by the process of warping the presumed model texture image go generated in step S24.

In the next step S28, the inverse normalization transform is performed on the texture image $g_0'$ calculated in step S27, using the light source parameter u. The inverse normalization section 207 performs the inverse normalization transform to add the influence of shading, using the light source parameter u generated by the parameter generating section 201, on the texture image $g_0'$. When we represent the texture image that has been subjected to inverse normalization transform by $g_1$, the inverse normalization transform Tu can be represented by the following equation (38).

In the next step S29, the texture image $g_1$ that has been subjected to inverse normalization transform in step S28 is projected on the model shape x that has been pose-transform in step S23. Projection is performed by the projecting section 205. The projecting section 205 projects the texture image $g_1$ on the three-dimensional shape x. Therefore, the three-dimensional shape and the texture image are projected offset from each other.

In step S30, the presumed model texture $g_1$ projected in step S29 is mapped on the u-v plane. Thus, the texture image $g_{im}$ is generated. Thereafter, the normalization transform to remove shading from the generated texture image $g_{im}$ is performed (step S31).

The normalization section 209 performs the normalization transform to remove the influence of shading from the texture image $g_{im}$, on the texture image $g_{im}$, using the light source parameter u and the perturbation vector $\delta u$ generated by the parameter generating section 201. When we represent the normalized texture image by $g_s$, the normalization transform using the light source parameters $u+\delta u$ can be represented by the equation (39).

In the next step S32, residual of the gray levels between the model texture image $g_m$ calculated in step S22 and the texture image $g_s$ normalization-transformed in step S31 is calculated. The texture comparing section 211 calculates the residual $\delta g$ of the gray levels between the model texture image $g_m$ and the texture image $g_s$. The residual $\delta g$ is given by the equation (40)

In this manner, in accordance with the parameter generated by the parameter generating section 201, the residual $\delta g$ of the gray level is calculated. A plurality of parameters are generated by the parameter generating section 201 and the residuals $\delta g$ are calculated for respective parameters. The calculated residuals $\delta g$ are stored, in correspondence with the parameters, in the sample data storing section 213.

The modification matrix calculating section 215 calculates the modification matrix by using multiple regression, based on a multiple sets of the perturbation vectors $\delta c$, $\delta t$ and $\delta u$ for respective parameters and the residuals $\delta g$ calculated in correspondence therewith. When we represent modification matrixes by Rc, Rt and Ru, the modification matrixes can be obtained by using the equation (41). Here, C represents a matrix having $\delta c_i (i=1, \ldots, s)$ arranged in the column direction, and x represents a matrix having $\delta g_i (i=1, \ldots, s)$ arranged in the column direction, where s represents the number of samples.

As the modification matrixes Rc, Rt and Ru are calculated by the modification matrix calculating section 215, the modification matrixes are transmitted to the parameter transformation section 301 of parameter search section 30. Thus, at the parameter search section 30, the parameters to be transformed at the parameter transformation section can be transformed in accordance with the error vector $\delta g$ calculated at the texture comparing section 313, and therefore, the integrated model defined by the integrated model parameter can be approximated to the object in the input two-dimensional image faster. This enables high speed recognition of the object.

Next, assume that N two-dimensional images of the same person picked-up at different angles are input to the two-dimensional image input section 18. In the parameter search processing shown in FIG. 4, there are N two-dimensional images to be orthogonally projected in step S04. When we represent these images by $g_i (i=1, \ldots, n)$, the processes from steps S04 to S07 are performed for every one of the input two-dimensional images $g_i$.

As a result, the error vector calculated in step S07 is provided for every input two-dimensional image $g_i$. Now, when we represent the error vector corresponding to the input two-dimensional image $g_i$ as $\delta g_i$, in step S08, the norm square of the calculated error vector $\delta g_i$ should be compared with the prescribed threshold value. The sum of the norm square of error vector $\delta g_i$ is given by the equation (42).

In the next step S09, the perturbation vector $\delta c$ for the integrated model parameter c, the perturbation vector $\delta t$ of the pose parameter t and the perturbation vector $\delta u$ of the light source parameter u are calculated for every one of the input two-dimensional images $g_i$, that is, a total of n such vectors are calculated.

In step S10, the parameters c, t and u are modified based on n perturbation vectors $\delta c_i$, $\delta t_i$ and $\delta u_i (i=1, \ldots, n)$, respectively. The equations for correcting the parameters used at this time are represented by the equations (43). Thus, the corrected parameters include one integrated model parameter c, N pose parameters $t_1$ to $t_N$, and N light source parameters $u_1$ to $u_N$.

$$\left.\begin{array}{l}\delta c = R_c \delta g \\ \delta t = R_t \delta g \\ \delta u = R_u \delta g\end{array}\right\} \quad (31)$$

$$x_m = \bar{x} + P_s W_s^{-1} Q_s (c + \delta c) \quad (32)$$

$$g_m = \bar{g} + P_g Q_g (c + \delta c) \quad (33)$$

$$x = T_{1+\delta t}(x_m) \quad (34)$$

$$x_0 = \bar{x} + P_s W_s^{-1} Q_s c \quad (35)$$

$$g_0 = \bar{x} + P_g Q_g c \quad (36)$$

$$x_1 = T_t(x_0) \quad (37)$$

$$g_1 = T_u(g_0) \quad (38)$$

$$g_s = T_{u+\delta u}^{-1}(g_{im}) \quad (39)$$

$$\delta g = g_s - g_m \quad (40)$$

$$R = C(X^T X)^{-1} X^T \quad (41)$$

$$E = \sum_{i=1}^{n} |\delta g_i|^2 \quad (42)$$

$$\left.\begin{array}{l}c = c - k \sum_{i=1}^{N} \delta c_i / N \\ t_1 = t_1 - k\delta t_1 \\ u_1 = u_1 - k\delta u_1 \\ \ldots \\ t_N = t_N - k\delta t_N \\ u_N = u_N - k\delta u_N\end{array}\right\} \quad (43)$$

In this manner, when N two-dimensional images are input, the integrated model parameter c can be calculated with higher accuracy as the number if input two-dimensional images is increased, and hence the object can be recognized with higher accuracy.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing apparatus comprising:
a generating section for generating, in response to an applied model parameter, a three-dimensional shape model and a model texture image related to respective portions of the three-dimension shape model, the model texture image having gradation information of a surface of an object that is independent of either an incident angle of light and a direction of lighting, the model texture image on the three-dimensional shape model being prepared in advance, and the model texture image being data prepared by projecting the model texture image onto a single continuous plane, the single continuous plane being defined as a cylindrical coordinate represented by a surface of a cylindrical plane surrounding the three-dimensional shape model on which each polygon of the three-dimensional shape model corresponds to a predetermined position;

a receiving section receiving an input two-dimension image;
a projecting section for orthogonally projecting the input two-dimension image to the three-dimension shape model to form modified three-dimension shape model which is added gradation information to the respective polygon of the three-dimension shape model;
a mapping section for mapping the gradation information of the modified three-dimension shape model onto the cylindrical plane to form the texture corresponding to the input two-dimension image;
a texture comparing section for comparing the mapped model texture corresponding to the input two-dimensional image with the model texture image based on the applied model parameter; and
a calculating section for calculating a parameter in accordance with the result of comparing by the texture comparing section and applying the calculated parameter to said generating section.

2. The data processing apparatus according to claim 1, wherein the calculator section calculates the parameter so as to have the model texture image resembling the produced texture image.

3. The data processing apparatus according to claim 1, wherein shading effects of the two-dimensional image are eliminated for the comparison according to a presumed light source, the presumption is based on the input two-dimensional image.

4. The data processing apparatus according to claim 3, wherein the shading effects are represented by light beams from three different directions.

5. The data processing apparatus according to claim 1, wherein the generating section, the modulating section and the calculating section execute the respective processes repeatedly until a difference between the produced texture image and the generated model texture image becomes lower than a prescribed threshold.

6. The data processing apparatus according to claim 5, further comprising a learning section for calculating a modification matrix on the basis of a perturbation of the parameter, wherein the modulations of the two-dimensional image are executed according to the calculated modification matrix.

7. The data processing apparatus according to claim 1, wherein the modulated two-dimensional image and the generated model texture image are respectively projected onto the same plane surface for the comparison.

8. The data processing apparatus according to claim 1, wherein the modulated two-dimensional image and the generated texture image are represented by vectors, and among difference components between the vector of the modulated two-dimensional image and the vector of the generated model texture image, said calculating section sets to zero a component exceeding a prescribed value.

9. The data processing apparatus according to claim 1, wherein the three-dimensional shape model and the model texture image are generated by extractions of the shape model and the model texture image among a plurality of stored three-dimensional shape models and a plurality of model texture images stored in relation to respective three-dimensional shape models.

10. The data processing apparatus according to claim 1, further comprising:
memory storing a plurality of pieces of identity information corresponding to respective parameters; and
a recognizing section for extracting a piece of identity information corresponding to the calculated parameter from the memory;

whereby an object shown by the input two-dimensional image is identified.

11. The data processing apparatus according to claim 1, further comprising a second generating section for generating data representing the object shown by the input two-dimensional image on the basis of the input two-dimensional image, a three-dimensional shape model generated by applying a calculated parameter to the generating section, and the model texture image corresponding to the thus generated three-dimensional shape model.

12. The data processing apparatus according to claim 11, wherein the object shown by the input two-dimensional image includes a face of a person, and the generated data represents a face of the person different in facial expression from the face shown by the input two-dimensional image.

13. The data processing apparatus according to claim 11, wherein the object shown by the input two-dimensional image includes a face of a person, and the generated data represents a face of the person differing in orientation from the face shown by the input two-dimensional image.

14. The data processing apparatus according to claim 1, wherein the three-dimensional shape model is represented by a linear sum of a plurality of three-dimensional shapes as basis, obtained by principal-component analysis of three-dimensional shapes of a plurality of objects.

15. The data processing apparatus according to claim 1, wherein the generated model texture image is represented by a linear sum of a plurality of textures as basis, obtained by principal-component analysis of a plurality of textures.

16. The data processing apparatus according to claim 1, wherein
said receiving section receives inputs of a plurality of two-dimensional images including one same object,
said modulating section modulates each of the plurality of input two-dimensional images onto the three-dimensional shape model, and
said calculating section calculates a parameter for each of the projected plurality of two-dimensional images.

17. The data processing apparatus according to claim 1, wherein the parameter is at least one of an integrated model parameter, a pose parameter and a light parameter.

18. The data processing apparatus according to claim 1, wherein the calculating section calculates a difference between the produced texture image and the generated model texture image as an error vector, and the calculating section calculates the parameter so as to minimize the error vector.

19. A method of data processing two-dimensional image data comprising:
generating by a generating section, in response to an applied model parameter, a three-dimensional shape model and a model texture image related to respective portions of the three-dimension shape model, the model texture image having gradation information of a surface of an object that is independent of either an incident angle of light and a direction of lighting, the model texture image on the three-dimensional shape model being prepared in advance, and the model texture image being data prepared by projecting the model texture image onto a single continuous plane, the single continuous plane being defined as a cylindrical coordinate represented by a surface of a cylindrical plane surrounding the three-dimensional shape model on which each polygon of the three-dimensional shape model corresponds to a predetermined position;
receiving an input two-dimension image;
orthogonally projecting the input two-dimension image to the three-dimension shape model to form modified three-dimension shape model which is added gradation information to the respective polygon of the three-dimension shape model;
mapping the gradation information of the modified three-dimension shape model onto the cylindrical plane to form the texture corresponding to the input two-dimension image; and
calculating a parameter in accordance with the modulated two-dimensional image and applying the calculated parameter to said generating section, wherein the parameter is calculated by comparing on the plane the texture image with the generated model texture image.

20. A data-processing apparatus comprising:
a generating section for generating, in response to an applied model parameter, a three-dimensional shape model and a model texture related to respective portions of the three-dimensional shape model, the model texture related to respective portions of the three-dimensional shape model being prepared in advance, and the model texture image being data prepared by projecting the model texture image onto a single continuous plane, the single continuous plane being defined as a cylindrical coordinate represented by a surface of a cylindrical plane surrounding the three-dimensional shape model on which each polygon of the three-dimensional shape model corresponds to a predetermined position;
a receiving section for receiving an input two-dimensional image;
a projecting section for orthogonally projecting the input two-dimension image to the three-dimension shape model to form modified three-dimension shape model which is added gradation information to the respective polygon of the three-dimension shape model;
a mapping section for mapping the gradation information of the modified three-dimension shape model onto the cylindrical plane to form the texture corresponding to the input two-dimension image;
a comparing section for comparing on the plane the mapped texture with the model texture; and
a modifying section for modifying said applied model parameter in accordance with a result of said comparing section.

21. The data-processing apparatus according to claim 20, wherein said model texture has gradation information of a surface independent of a direction of illumination.

* * * * *